United States Patent [19]

Wakiyama et al.

[11] Patent Number: 5,166,841
[45] Date of Patent: Nov. 24, 1992

[54] TAPE TRANSPORT APPARATUS

[75] Inventors: Koji Wakiyama, Kadoma; Kiyoshi Ota, Tokyo, both of Japan

[73] Assignee: Matsushita Electric Industrial Co., Ltd., Osaka, Japan

[21] Appl. No.: 477,842

[22] PCT Filed: Aug. 1, 1989

[86] PCT No.: PCT/JP89/00790

§ 371 Date: Apr. 4, 1990

§ 102(e) Date: Apr. 4, 1990

[87] PCT Pub. No.: WO90/01770

PCT Pub. Date: Feb. 22, 1990

[30] Foreign Application Priority Data

Aug. 8, 1988 [JP] Japan .................. 63-197407

[51] Int. Cl.⁵ .......................................... G11B 15/52
[52] U.S. Cl. .................................................. 360/73.14
[58] Field of Search .................... 360/73.14, 73.09

[56] References Cited

U.S. PATENT DOCUMENTS 4,051,415  9/1977  Martin .
4,628,375  12/1986  Stadlmann .

FOREIGN PATENT DOCUMENTS

0258615A2  7/1987  European Pat. Off. .
2217763    2/1973  France .
56-51422   12/1981  Japan .
61-58890   12/1986  Japan .
62-35157    9/1987  Japan .
2037018A    7/1980  United Kingdom .
2083304A    7/1981  United Kingdom .

OTHER PUBLICATIONS

"Electrical Differential Tap Drive System"; IBM Technical Disclosure Bulletin; J. S. Weidenhammer, vol. 12 No. 11 Apr. 1970.

Primary Examiner—A. J. Heinz
Attorney, Agent, or Firm—Wenderoth, Lind & Ponack

[57] ABSTRACT

A recording/reproducing apparatus using a tape medium, includes: two reels for winding and feeding the tape; a driver for drving the reels, a tape speed detector for that outputting speed data on the tape; a periodical desired value circuit for outputting a desired speed value of the tape; a tape speed error detector for outputting an error quantity between the output of the tape speed detector and the output of the periodic desired value circuit, and a driving side determining circuit for outputting a drive instruction to the reel of the winding side at the time of acceleration and which, at the time of deceleration, outputs a drive instruction corresponding to the output of the tape speed error detector to the reel of the feeding side, in order to control the tape speed by driving the reels. The deceleration torque is now applied to the reel of the feeding side that could not be applied to the reel of the winding side since the tape slackens conventionally. Therefore, the tape speed can now be decelerated within short periods of time, and the tape transport enables the speed of the tape to be accelerated or decelerated stably at all times through the same processing.

2 Claims, 9 Drawing Sheets

TAPE TRANSPORT APPARATUS

TECHNICAL FIELD

The present invention relates to a tape transport apparatus for use in a video tape recorder, a digital audio tape recorder or the like.

BACKGROUND ART

Recently, in a recording reproducing apparatus using a tape medium, there is a growing demand for a recording apparatus which is long time-recordable and accomplishes a quick access. Regarding the high access, the increase of a tape transport speed and the reduction of acceleration and deceleration times are the technical problems to be solved.

Tape transport apparatuses are disclosed in, for example, Japanese Laid-Open Patent Publication No. 59-165260 and Japanese Laid-Open Patent Publication No. 59-165261.

An example of a conventional tape transport apparatus is described below.

A conventional tape transport apparatus comprises a winding reel, a supply reel, two rotation-number detectors for detecting the number of rotations of the two reels, two rectification smoothing devices for smoothing the outputs of the rotation-number detectors, an adder for adding the outputs of the two rectification smoothing devices, a comparator for comparing the output of a speed setting signal indicative of a tape speed with the output of the adder, an integrator, and a reel motor.

Regarding its operation, the rotation condition of the winding reel is detected by the first rotation-number detector and transmitted to the adder through the first rectification smoothing device. Similarly, the rotation condition of the supply reel is detected by the second rotation-number detector, transmitted to the adder through the second rectification smoothing device, and added to the output of the first rectification smoothing device. The comparator compares the speed setting signal with the output of the adder and the result is outputted to the integrator as a speed error signal. In order for the reel motor for driving the winding reel to receive the integrated speed error signal, the rotation of the winding reel is feedback-controlled.

However, according to the above-described construction, it is difficult, in particular, to control the torque applied to the winding reel when the tape speed is reduced. Desirably, a deceleration torque is applied to the winding reel in order to reduce the tape speed, but the tape is loosened if the deceleration torque is too large.

If the reduction torque is applied to the supply reel, the operation is a special processing to temporarily release the feedback control over the winding reel in the transient condition in which a high speed transport is switched to a low speed transport. Thus, the known tape transport apparatus has a problem that it has difficulty in controlling in detail, for example, the deceleration torque amount and deceleration time.

DISCLOSURE OF THE INVENTION

It is the object of the present invention to achieve stable acceleration and deceleration controls of a tape when the tape transports at steady, acceleration, and deceleration speeds through the same processing, and particularly, provide a tape transport apparatus capable of reducing a tape speed in a time shorter than conventional tape transport apparatuses do.

In order to achieve the above-described object, the present invention comprises: two reels for winding and feeding a tape; drive means for driving the two reels respectively; a tape speed detecting means for outputting the speed data on the tape; a desired value circuit for outputting the desired value of the tape speed; a tape speed error detecting means for outputting an error quantity between the output of the tape speed detecting means and the output of the desired value circuit; and a driving side determining circuit which receives the output of the tape speed error detecting means and, based on the error quantity of the speed, outputs a drive instruction to the drive means on the winding side when the tape speed is less than a desired value and to the drive means on the feeding side when the tape speed is more than the desired value.

BRIEF DESCRIPTION OF THE DRAWINGS

FIGS. 3A–3J are waveform diagrams of each section of the first embodiment;

FIGS. 4(a)–4(c) together form a block diagram showing a tape transport apparatus according to a second embodiment of the present invention; and FIGS. 5K0–5K16 waveform diagrams of each section of the second embodiment.

DESCRIPTION OF THE PREFERRED EMBODIMENTS

A tape transport apparatus in accordance with the present invention is described with reference to the drawings.

Figure 1:
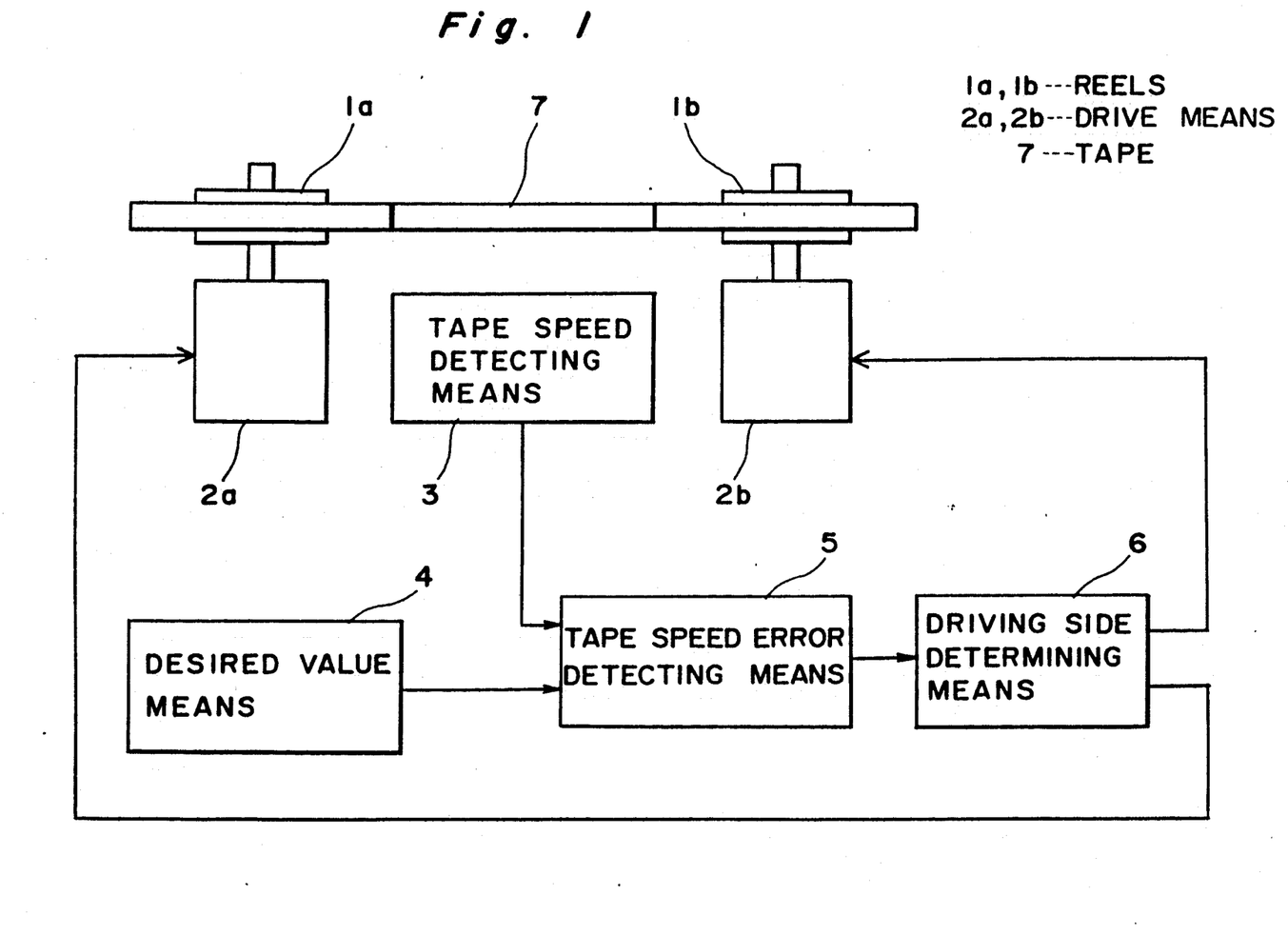
FIG. 1 is a block diagram, showing a tape transport apparatus, for describing the outline of the present invention.

FIG. 1 is a block diagram, showing the tape transport apparatus, for describing the outline of the present invention.

In FIG. 1, reference numerals 1a and 1b denote reels on which a tape is wound; numerals 2a and 2b denote drive means for driving the reels 1a and 1b, respectively; numeral 3 denotes a tape speed detecting means; numeral 4 denotes a desired value means for outputting the desired value of a tape speed; numeral 5 denotes a tape speed error detecting means for outputting an error quantity between the output of the tape speed detecting means 3 and the desired value means 4; numeral 6 denotes a driving side determining means for receiving the output of the tape speed error detecting means 5 and, based on the error quantity of the tape speed, outputting a drive instruction to the drive means on the winding side when the tape speed is less than the desired value and outputting a drive instruction to the drive means on the feeding side when the tape speed is more than the desired value; and numeral 7 denotes the tape.

The operation of the tape transport apparatus constructed as above is described below.

The tape speed is detected by the tape speed detecting means 3 and outputted to the tape speed error detecting means 5. The desired value of the tape speed is outputted from the desired value means 4 to the tape speed error detecting means 5. The outputs of the desired value means 4 and the tape speed detecting means 3 are compared by the tape speed error detecting means 5 and the error quantity of the tape speed relative to the desired value is outputted to the driving side determining means 6. When the tape speed is less than the desired value, the driving side determining means 6 outputs an error relative to the desired value of the tape speed to the drive means on the winding side as a drive instruction and when the tape speed is more than the desired value, the driving side determining means 6 outputs an error relative to the desired value of the tape speed to the drive means on the feeding side as a drive instruction. The drive means 2a and 2b drive the reels 1a and 1b, respectively in response to the drive instruction of the driving side determining means 6.

The embodiments of the present invention are described in detail with reference to FIGS. 2 and 3A-3J.

Figure 2:
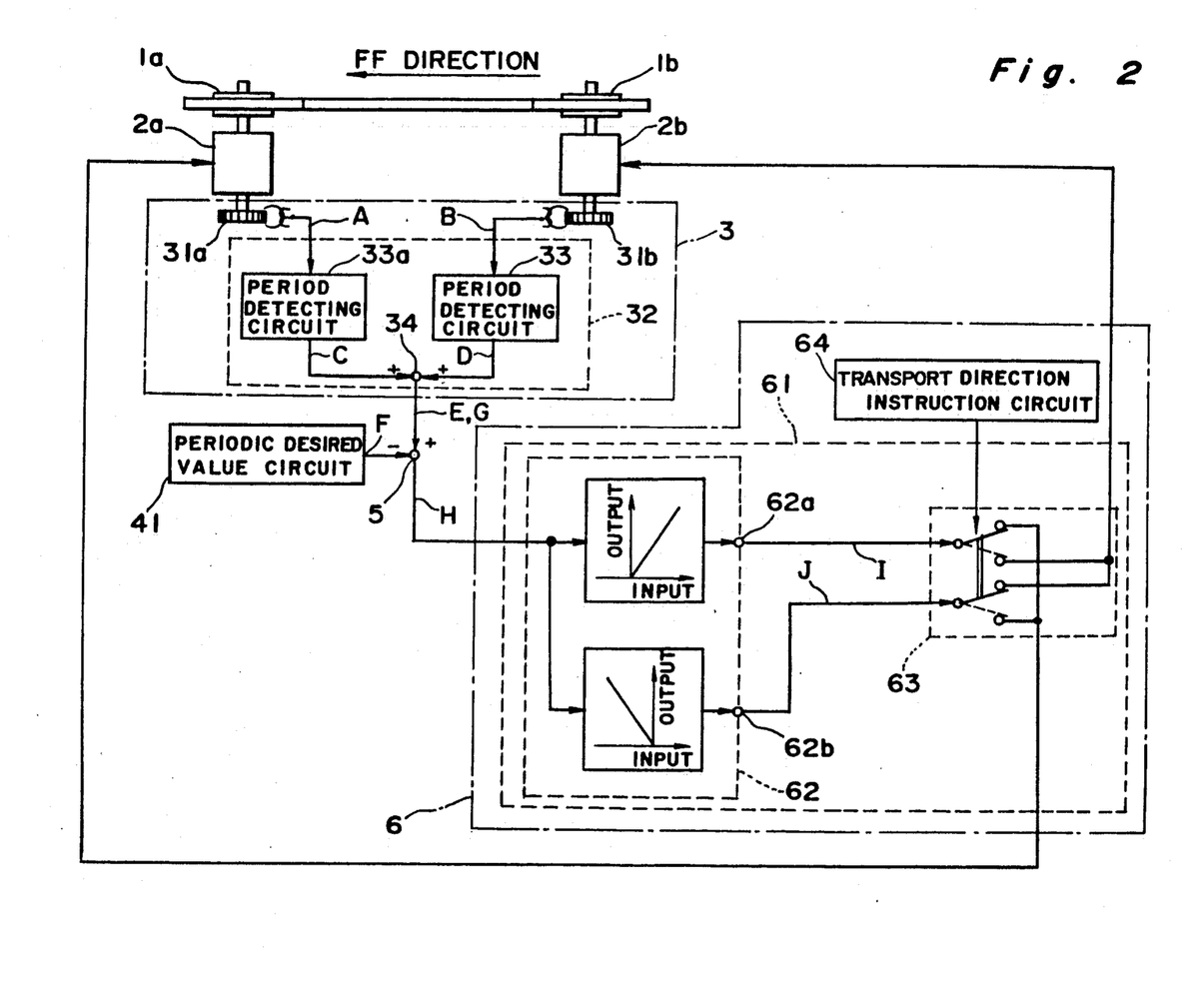
FIG. 2 is a block diagram showing a tape transport apparatus according to a first embodiment of the present invention.
Figure 3:
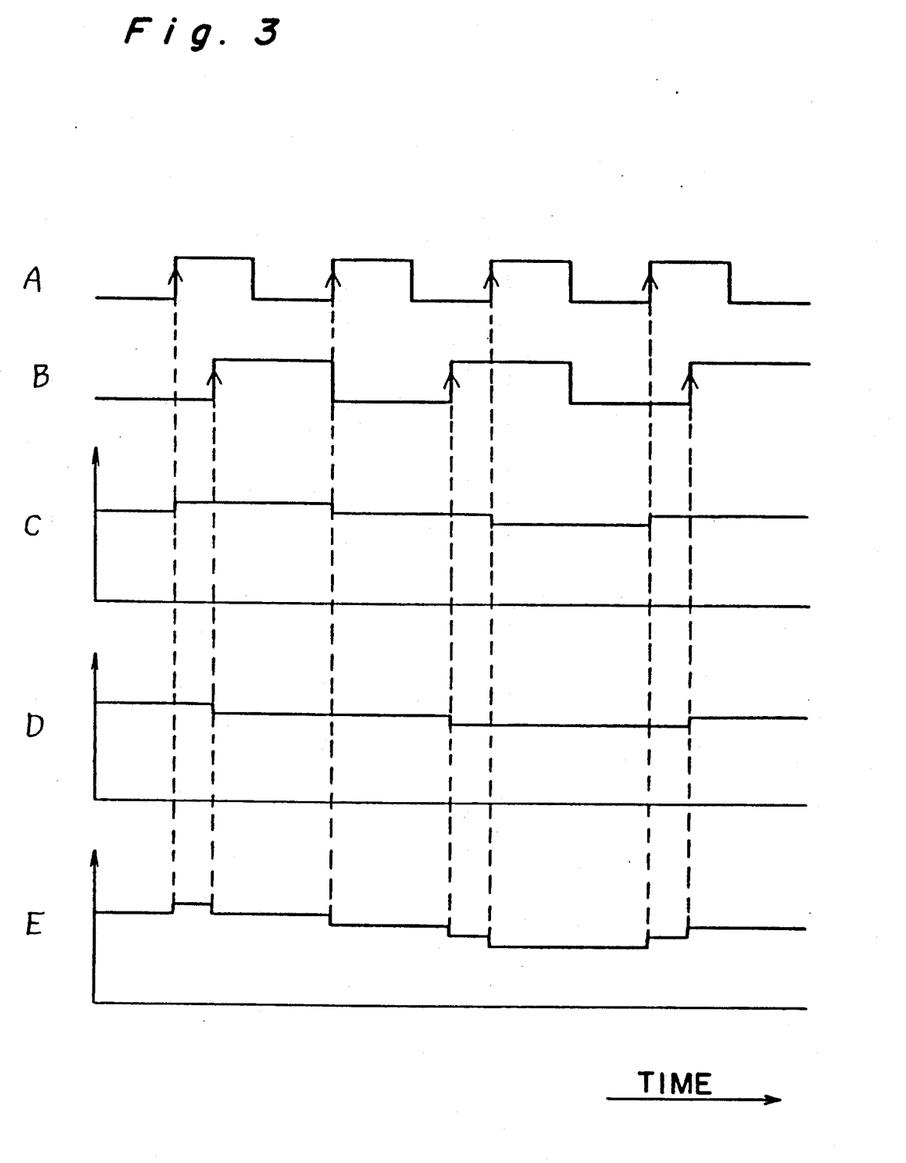

FIG. 2 is a block diagram of the tape transport apparatus of a first embodiment of the present invention; FIGS. 3A-3J are waveform diagrams of each section of the apparatus shown in FIG. 2. Parts of FIG. 2 corresponding to those of FIG. 1 are denoted by the same reference numerals, respectively and the descriptions thereof are omitted.

In FIG. 2, the direction in which the tape is wound from the reel 1b to the reel 1a is the fast speed feeding direction (hereinafter referred to as "FF direction") and the reverse thereof is the rewinding direction (hereinafter referred to as "REW direction").

Reference numerals 31a and 31b denote revolution detectors which output a pulse in proportion to the rotation periods of the reels 1a and 1b, respectively; numerals 33a and 33b denote period detecting circuits which output period data in response to the output pulse of the revolution detectors 31a and 31b, respectively; and numeral 34 denotes an adder circuit which adds the outputs of the period detecting circuits 33a and 33b, thus outputting an added result, respectively.

A tape speed detecting circuit 32 comprises the period detecting circuits 33a and 33b and the adder circuit 34, and the tape speed detecting means 3 comprises the revolution detectors 31a and 31b and the tape speed detecting circuit 32.

Reference numeral 41 denotes a periodic desired value circuit which outputs the desired value of the tape speed as the desired value of the addition of periods obtained by adding the pulse periods outputted from the revolution detectors 31a and 31b to each other, thus functioning as a desired value means.

Reference numeral 5 denotes a tape speed error detecting means which outputs the difference between the outputs of the periodic desired value circuit 41 and the adder circuit 34;, numeral 62 indicates a first switching circuit in which the output terminals thereof are switched according to the sign of the absolute value of the tape speed error detecting means 5; numeral 64 denotes a transport direction instruction circuit for instructing the transport direction (FF direction/REW direction) of the tape; and numeral 63 indicates a second switching circuit for switching the connection between the two outputs of the first switching circuit 62 and the drive means 2a and 2b in response to the output of the transport direction instruction circuit 64.

A driving side determining circuit 61 comprises the first and second switching circuits 62 and 63.

The operation of the tape transport apparatus constructed as above is described below.

The rotation conditions of the reels 1a and 1b are detected by the revolution detectors 31a and 31b as the periods of output pulses. The outputs of the revolution detectors 31a and 31b are shown FIGS. 3A and 3B. The periods of the output pulses of the revolution detectors 31a and 31b are converted into data amount in proportion to the periods by the period detecting circuits 33a and 33b and added by the adder circuit 34. Thus, the output of the adder circuit 34 is the representative value of the tape speed. The outputs of the period detecting circuits 33a and 33b and the adder circuit 34 are shown FIGS. 3C, 3D and 3E, respectively.

The tape speed error detecting means 5 calculates the difference between the outputs of the adder circuit 34 and the periodic desired value circuit 41 and outputs it to the first switching circuit 62. When the output of the tape speed error detecting means 5 is positive, the output of the adder circuit 34 is larger than the output of the periodic desired value circuit 41, that is, the tape speed is less than the desired value, and when the output of the tape speed error detecting means 5 is negative, the tape speed is more than the desired value.

As shown in FIG. 2, the first switching circuit 62 is provided with two terminals, first and second output terminals 62a and 62b, and the characteristic of the first output terminal 62a is that when an input value is positive, the input value is outputted and when the input value is negative, a predetermined value is outputted. The characteristic of the second output terminal 62b is that when an input value is positive, a predetermined value is outputted and when the input value is negative, the absolute value of the input value is outputted.

The second switching circuit 63 is a double switch having two inputs and two outputs, the switching operation thereof is performed in response to the output of the transport direction instruction circuit 64. When the output of the transport direction instruction circuit 64 is in the FF direction, the first output terminal 62a of the first switching circuit 62 is connected to the drive means 2a and the second output terminal 62b thereof is connected to the drive means 2b. When the output of the transport direction instruction circuit 64 is in the REW direction, the first output terminal 62a of the first switching circuit 62 is connected to the drive means 2b and the second output terminal 62b thereof is connected to the drive means 2a.

The drive means 2a and 2b respectively drive the reels 1a and 1b in response to the output of the second switching circuit 63.

Supposing that the transport direction instruction circuit 64 outputs an FF direction instruction and the output of the periodic desired value circuit 41 changes as shown in FIG. 3F, the output of the adder circuit 34 is shown in FIG. 3G, the output of the tape speed error detecting means 5 is shown FIG. 3H, and the outputs of the first output terminal 62a and 62b are shown in FIGS. 3I and 3J, respectively.

Since the transport direction instruction circuit 64 outputs the FF direction instruction, the reel 1a serves as the winding side and the first output terminal 62a is connected to the drive means 2a.

First, the case in which the output of the periodic desired value circuit 41 changes to a smaller value, namely, the case in which an acceleration instruction is outputted as the tape speed is considered. The output of the tape speed error detecting means 5 (FIG. 3H) becomes an error signal of a positive value. Since the input value of the first switching circuit 62 is positive, the output of the tape speed error detecting means 5 is transmitted to the first output terminal 62a without any change (FIG. 3I) and a drive instruction indicative of an acceleration is outputted to the drive means 2a through the second switching circuit 63. As a result, torque applied to the reel on the winding side (1a in the current condition) increases and thus, the tape speed becomes fast. When the output of the tape speed error detecting means 5 approaches zero, control is effected so that the addition of the periods of pulses outputted from the revolution detectors 31a and 31b becomes constant. Next, the case in which the output of the periodic desired value circuit 41 changes to a larger value, namely, the case in which a deceleration instruction is outputted as the tape speed is considered. The output of the tape speed error detecting means 5 (FIG. 3H) becomes an error signal of a negative value. Since the input value of the first switching circuit 62 is negative, the output of the tape speed error detecting means 5 is transmitted to the second output terminal 62b as the output from which the sign is removed (FIG. 3J) and a drive instruction is outputted to the drive means 2b through the second switching circuit 63. As a result, torque applied to the reel on the feeding side (1b in the current condition) increases and thus, the tape speed becomes slow. When the output of the tape speed error detecting means 5 approaches zero, control is effected so that the addition of the periods of pulses outputted from the revolution detectors 31a and 31b becomes constant.

Next, a second embodiment of the present invention is described with reference to drawings.

Figure 4A:
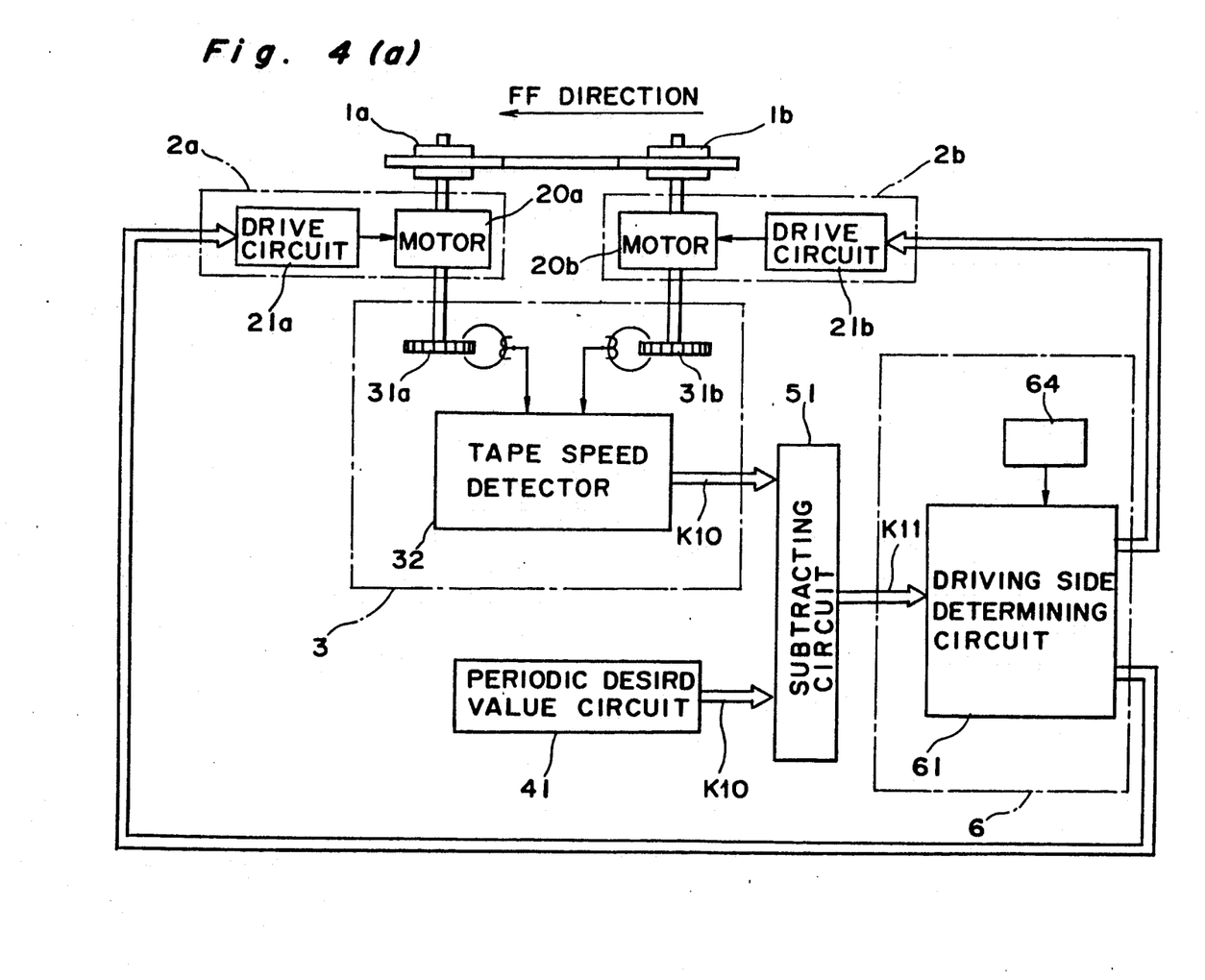
Figure 4B:
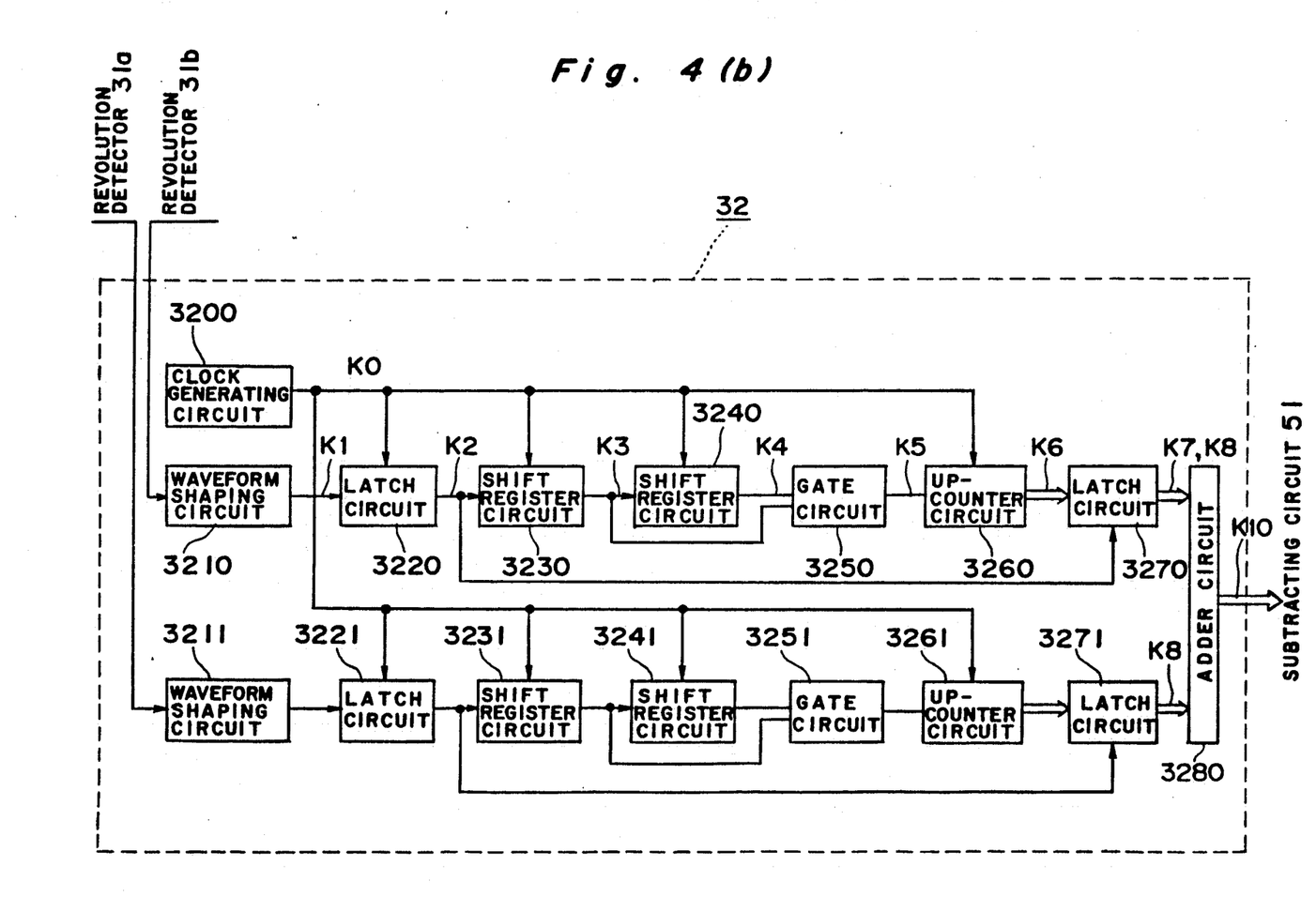

FIG. 4(a) is a block diagram of a tape transport apparatus of the second embodiment of the present invention; FIG. 4(b) is a concrete block diagram of the tape speed detecting circuit 32 of FIG. 4(a); and FIG. 4(c) is a concrete block diagram of the driving side determining circuit 61 of FIG. 4(a).

Figure 4C:
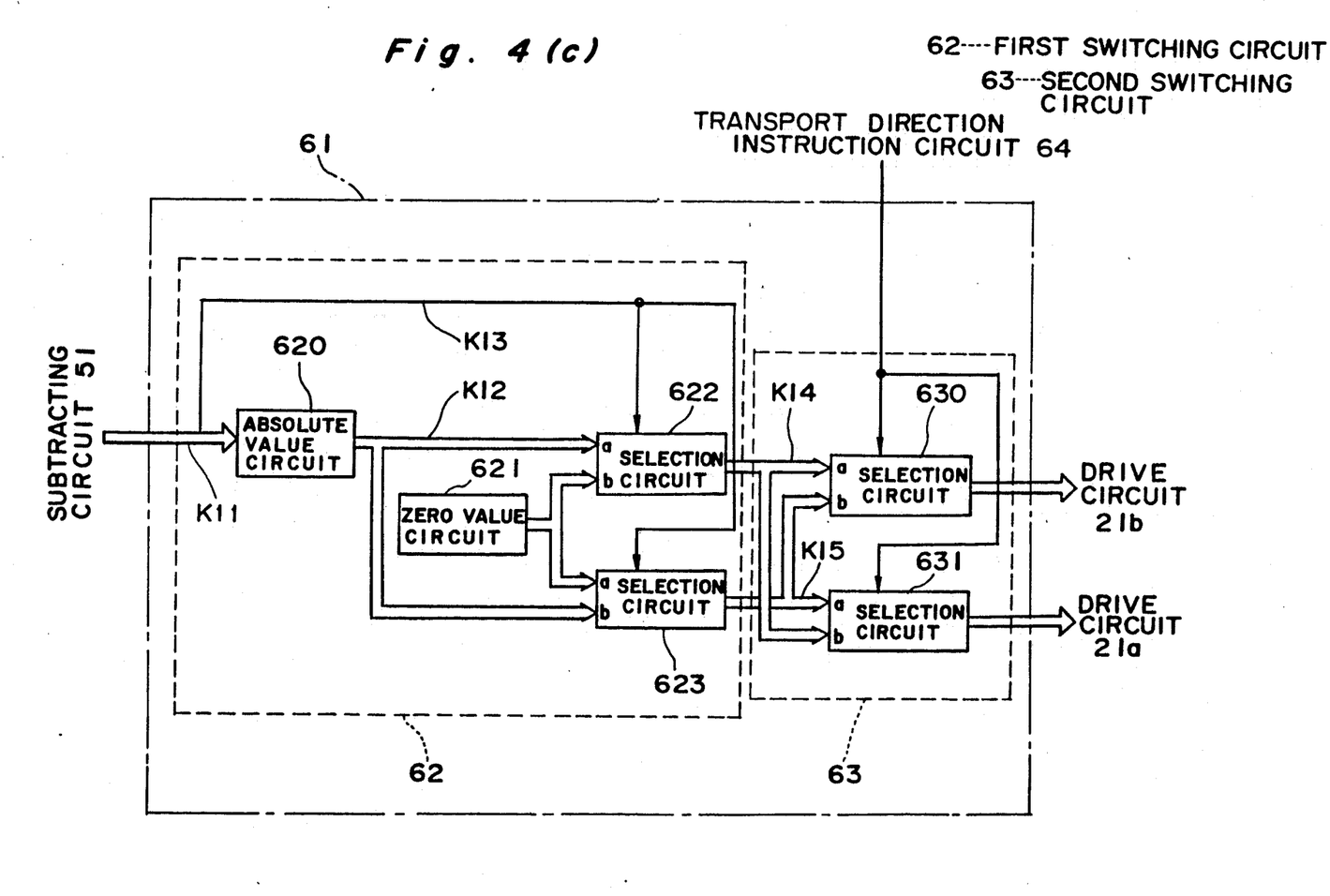

FIGS. 5K0–5K16 are waveform diagrams showing each section of the tape transport apparatus shown in FIGS. 4(a) through 4(c). Parts of FIG. 4(a) through 4(c) corresponding to those of FIGS. 1 and 2 are denoted by the same reference numerals, respectively and the descriptions thereof are omitted.

(In FIG. 4(b), reference numeral 3200 denotes a clock generating circuit which outputs a pulse signal (hereinafter referred to as "clock") of a constant period; numerals 3210 and 3211 denote waveform shaping circuits for converting the outputs of the revolution detectors 31b and 31a into a digital pulse signal, respectively; numerals 3220 and 3221 denote latch circuits for latching the levels of the output signals of the waveform shaping circuits 3210 and 3211 in synchronization with the loading period of the clock, respectively; numerals 3230 and 3231 denote shift register circuits for outputting each of the output signals of the latch circuits 3220 and 3221 by delaying it by one period of the clock, respectively; numerals 3240 and 3241 denote shift register circuits for outputting each of the output signals of the shift register circuits 3230 and 3231 by delaying it by one period of the clock, respectively; numeral 3250 denotes a gate circuit for outputting a low level (hereinafter referred to as an "L" level) signal only when the output signal of the shift register 3230 is at a high level (hereinafter referred to as an "H" level) signal and the output signal of the shift register 3240 is at "L" level; numeral 3251 denotes a gate circuit which outputs an "L" level signal only when the output signal of the shift register 3231 is at an "H" level and the output signal of the shift register circuit 3241 is at an "L" level; numeral 3260 denotes an up-counter circuit which performs a counting in the positive direction synchronously with the trailing period of the clock and resets a counted value to zero when the output of the gate circuit 3250 is at an "L" level; numeral 3261 denotes an up-counter circuit which performs a counting in the positive direction synchronously with the trailing period of the clock and resets a counted value to zero when the output of the gate circuit 3251 is at an "L" level; numeral 3270 denotes a latch circuit which latches the output data of the up-counter circuit 3260 synchronously with the loading of the output signal of the latch circuit 3220; numeral 3271 denotes a latch circuit which latches the output data of the up-counter circuit 3261 synchronously with the loading of the output signal of the latch circuit 3221; and numeral 3280 denotes an adder circuit which performs the addition of the output data of the latch circuit 3270 and the latch circuit 3271.

The tape speed detecting circuit 32 comprises the clock generating circuit 3200, the waveform shaping circuits 3210 and 3211, the latch circuits 3220, 3221, 3270, and 3271, the shift register circuits 3230, 3231, 3240, and 3241, the gate circuits 3250 and 3251, the up-counter circuits 3260 and 3261, and the adder circuit 3280. The tape speed detecting means 3 comprises the revolution detectors 31a, 31b, and the tape speed detecting circuit 32.

In FIG. 4(a), reference numeral 41 denotes a periodic desired value circuit which outputs the desired value of the tape speed as the desired value of the adder circuit 3280 obtained by adding the periods of pulses outputted from the revolution detectors 31a and 31b, thus functioning as a desired value circuit.

Reference numeral 51 denotes a subtracting circuit which outputs, with a positive/negative sign, a value obtained by subtracting the output data of the periodic desired value circuit 41 from the output data of the adder circuit 3280, thus functioning as a tape speed error detecting means 5.

In FIG. 4(c), reference numeral 620 denotes an absolute value circuit which calculates the absolute value of the output value of the subtracting circuit 51; numeral 621 denotes a zero value circuit which outputs a value corresponding to zero value in the output of the absolute value circuit 620; numeral 22 denotes a selection circuit which outputs the input value (output value of the absolute value circuit 620) of the (a) terminal thereof when the output value of the subtracting circuit 51 is positive and outputs the input value (output value of the zero value circuit 621) of the (b) terminal thereof when the output value of the subtracting circuit 51 is negative; numeral 623 denotes a selection circuit which outputs the input value (output value of the zero value circuit 621) of the (a) terminal thereof when the output value of the subtracting circuit 51 is positive and outputs the input value (output value of the absolute value circuit 620) of the (b) terminal thereof when the output value of the subtracting circuit 51 is negative; 630 denotes a selection circuit which outputs the input value (output value of the selection circuit 622) of the (a) terminal thereof when the output of the transport direction instruction circuit 64 is a signal in the REW direction and outputs the input value (output value of the selection circuit 623) of the (b) terminal thereof when the output signal of the transport direction instruction circuit 64 is a signal in the FF direction; and numeral 631 denotes a selection circuit which outputs the input value (output value of the selection circuit 623) of the (a) terminal thereof when the output of the transport direction instruction circuit 64 is a signal in the REW direction and outputs the input value (output value of the selection circuit 622) of the (b) terminal thereof when the output of the transport direction instruction circuit 64 is a signal in the FF direction.

The first switching circuit 62 comprises the absolute value circuit 620, the zero value circuit 621, and the selection circuits 622 and 623. The second switching circuit 63 comprises the selection circuits 630 and 631. The driving side determining circuit 61 comprises the first switching circuit 62 and the second switching circuit 63.

In FIG. 4(a), reference numerals 20a and 20b denote motors for rotating the reels 1a and 1b in the tape winding direction;, numeral 21a denotes a drive circuit for driving the motor 20a so that the motor 20a generates torque based on the output value of the selection circuit 631; and numeral 21b denotes a drive circuit for driving the motor 20b so that the motor 20b generates torque based on the output value of the selection circuit 630.

The drive means 2a comprises the motor 20a and the drive circuit 21a. The drive means 2b comprises the motor 20b and the drive circuit 21b.

The operation of the tape transport apparatus constructed as above is described below.

Figure 5:
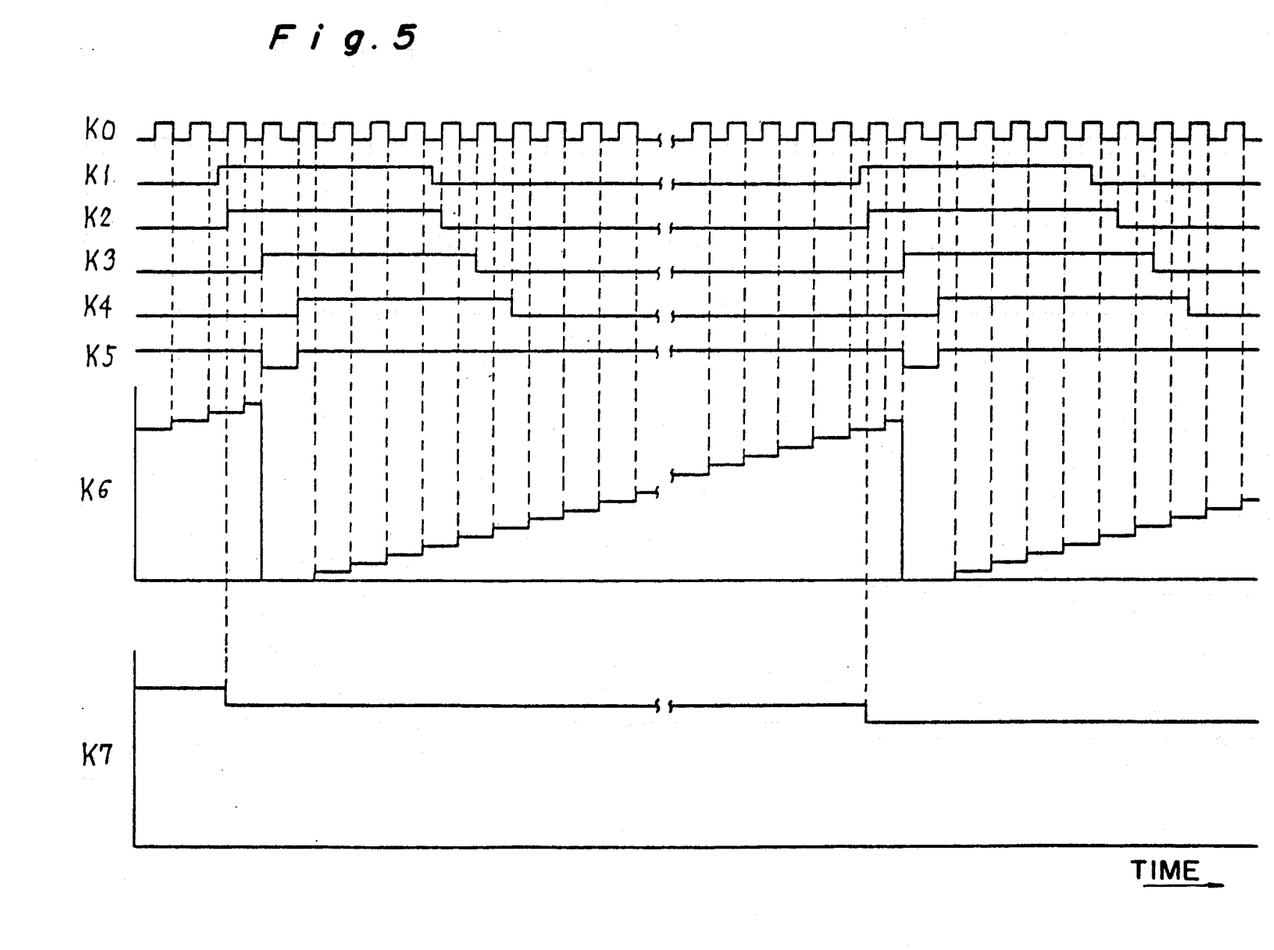

The rotation conditions of the reels 1a and 1b are detected as periods of pulses by the revolution detectors 31a and 31b, respectively and converted the periods into digital pulse signals by the waveform shaping circuits 3210 and 3211. The output signals of the waveform shaping circuit 3210 are shown in FIG. 5K1. In the latch circuit 3220, the pulse period of the revolution detector 31a is converted into a signal synchronized with the loading signal of the clock. The clock and the output signals of the latch circuit 3220 are shown in FIGS. 5K0 and 5K2, respectively. The shift register circuit 3230 outputs the output of the latch circuit 3220 by delaying it by one period of the clock and the shift register circuit 3240 outputs the output of the shift register circuit 3230 by delaying it by one period of the clock. The output signals of the shift register circuits 3230 and 3240 are shown in FIGS. 5K3 and 5K4, respectively. Since the gate circuit 3250 outputs an "L" level signal only when the output of the shift register circuit 3230 is at an "H" level and the output of the shift register circuit 3240 is at an "L" level, the output signal thereof is as shown in FIG. 5K5. The up-counter 3260 resets a counted value to zero when the output signal of the gate circuit 3250 becomes "L" level and performs a counting in the positive direction synchronously with the trailing of the clock when the output level of the gate circuit 3250 is at an "H" level. The output data of the up-counter 3260 is shown in FIG. 5K6. The output which has latched the output data of the up-counter circuit 3260 synchronously with the loading of the output signal of the latch circuit 3220 in the latch circuit 3270 becomes data in proportion to the pulse period of the revolution detector 31b. The output data of the latch circuit 3270 is shown in FIGS. 5K7 and 5K8. Similarly, it is apparent that the output of the latch circuit 3271 becomes data in proportion to the pulse period of the revolution detector 31a. The output signal of the latch circuit 3271 is shown in FIG. 5K9. The adder circuit 3280 performs the addition of the output data of the latch circuits 3270 and 3271. The output of the adder circuit 3280 becomes the representative value of the tape speed. The output value of the adder circuit 3280 is shown in FIG. 5K10.

In the periodic desired value circuit 41, a value corresponding to a value obtained by adding the periods of pulses outputted from the adder circuit 3280 is outputted as the desired value of the tape speed. An example of the output of the periodic desired value circuit 41 is shown in FIG. 5K10 as a dotted line.

In the subtracting circuit 51, a value obtained by subtracting the output of the periodic desired value circuit 41 from the output of the adder circuit 3280 is outputted to the absolute value circuit 620 and the sign information thereof is outputted to the selection circuits 622 and 623. The output value of the subtracting circuit 51 and the sign information thereof are shown in FIGS. 5K11 and 5K12, respectively. The absolute value of an input value is always outputted from the absolute value circuit 620. The output of the absolute value circuit 620 is shown in FIG. 5K13. When the output of the subtracting circuit 51 is positive, the output of the adder circuit 3280 is larger than the output of the periodic desired value circuit 41, that is, the tape speed is less than the desired value, and when the value of the output of subtracting circuit 51 is negative, the tape speed is more than the desired value. The selection circuits 622 and 623 output the value of the absolute value circuit 620 when the outputs of the subtracting circuit 51 are positive and negative. Otherwise, the selection circuits 622 and 623 output the value of the zero value circuit 621. The output of the selection circuit 622 is shown in FIG. 5K14 and the output of the selection circuit 623 is shown in FIG. 5K15.

In response to the output of the transport direction instruction circuit 64, the selection circuits 630 and 631 output either of the values of the selection circuits 622 and 623. When the output of the transport direction instruction circuit 64 is in the FF direction, the value of the selection circuit 623 is selected as the output of the selection circuit 630, and the value of the selection circuit 622 is selected as the output of the selection circuit 631. When the output of the transport direction instruction circuit 64 is in the REW direction, the value of the selection circuit 622 is selected as the output of the selection circuit 630, and the value of the selection circuit 623 is selected as the output of the selection circuit 631.

In response to the outputs of the selection circuits 631 and 630, the drive circuits 21a and 21b drive the motors 20a and 20b, respectively so that the motors 20a and 20b generate torques and drive the reels 1a and 1b.

Similarly to the first embodiment, supposing that the transport direction instruction circuit 64 outputs the FF direction instruction, when the tape speed is less than the desired value, the output of the absolute value circuit 620 is transmitted to the drive circuit 21a. When the tape speed is more than the desired value, the output of the absolute value circuit 620 is transmitted to the drive circuit 21b.

That is, control is made so that the addition of the periods of pulses outputted from the revolution detectors 31a and 31b is the same as the output value of the periodic desired value circuit 41. Thus, the transport speed of the tape is determined. The time transition of the transport speed of the tape thus controlled is shown in FIG. 5K16.

The tape speed detecting means 3, the periodic desired value circuit 41, and the driving side determining means 6 of the first and second embodiments can be executed by the processing of a microcomputer.

In the first and second embodiments, the output of the tape speed detecting means 3 is obtained by adding the periods of pulses outputted from the revolution detectors 31a and 31b to each other, but the tape speed can be detected by outputting the sum of square of the information on the rotation periods of both reels or by recording a signal onto a tape using a fixed head and outputting the signal period at the time of a reproduction, and thus, to the embodiments is not limited.

As described in detail above, a stable acceleration and deceleration of a tape transport can be accomplished by the same processing and in particular, the deceleration of a tape speed can be accomplished in a short period of time by applying deceleration torque to the reel on the feeding side instead of applying to the reel on the winding side, which slackens the tape.

For example, when the present invention is applied to the tape transport system of a video tape recorder or a digital audio tape recorder, the period of time required for changing from a tape winding condition at a high speed to a tape stop condition can be reduced and the merit in a high speed, such as the initial read-out of information, can be best obtained.

What is claimed is:

1. A tape transport apparatus for reversibly feeding a tape, comprising:
   two reels for winding and feeding the tape;
   a drive means, positioned on winding and feeding sides, for driving said two reels in accordance with a driving force in response to a corresponding input signal inputted thereto;
   a tape speed detecting means for detecting a number of rotations of said reels and thus forming and outputting speed data on the tape;
   a desired value setting means for outputting a desired value of a tape speed;
   a tape speed error detecting means for comparing an output signal of said tape speed detecting means with an output signal of said desired value setting means and then outputting a tape speed error signal with one of a positive and a negative signal at that time;
   an absolute value circuit, connected to said tape speed error detecting means, for outputting an absolute value of said tape speed error signal of said tape speed error detecting means;
   a predetermined value generating circuit for generating a predetermined output value in correspondence with said input signal inputted to said driving means;
   a transport direction instruction circuit for outputting an output signal for instructing a transport direction of the tape;
   a first switching circuit for selecting, in accordance with the sign of said tape speed error signal of said tape speed error detecting means, and for outputting said absolute value of said absolute value circuit and said predetermined output value of said predetermined value circuit which have been inputted to said first switching circuit; and
   a second switching circuit for selecting, in accordance with said output signal of said transport direction instruction circuit, and for outputting two output signals which have been outputted from said first switching circuit and which have been inputted to said second switching circuit;
   wherein when the sign of said output signal of said transport direction instruction circuit is positive and the sign of said tape speed error signal of said tape speed error detecting means is positive, the absolute value of said absolute value circuit is transmitted to said driving means on the winding side in transporting the tape in a positive transport direction, and the predetermined output value of said predetermined value circuit is transmitted to said drive means on the feeding side in transporting the tape in a positive transport direction.

2. A tape transport apparatus comprising:
   two reels for winding and feeding a tape;
   drive means, positioned on winding and feeding sides, for driving said two reels;
   a tape speed detecting means for detecting a number of rotations of said reels and thus forming and outputting speed data on the tape;
   a desired value circuit for outputting a desired value of a tape speed;
   a tape speed error detecting means for outputting an error quantity, between an output of said tape speed detecting means and an output of said desired value circuit, with a positive/negative sign;
   a transport direction instruction circuit for outputting an output signal for instructing a transport direction of the tape; and
   a driving side determining circuit which receives the output of said tape speed error detecting means and, based on said output of said transport direction instruction circuit, outputs an output of said speed error detecting means to said drive means on the winding side when the tape speed is less than the desired value and to said drive means on the feeding side when the tape speed is more than the desired value;
   wherein said tape speed detecting means comprises:
   two revolution detectors for outputting pulse signals corresponding to rotation periods of said reels respectively;
   and a tape speed detecting circuit for, as speed data on the tape, calculating addition of periods of pulse signals of the revolution detectors.

* * * * *